(12) United States Patent
Allaei

(10) Patent No.: US 6,708,962 B2
(45) Date of Patent: Mar. 23, 2004

(54) SMART ISOLATION MOUNTS WITH CONTINUOUS STRUCTURAL ELEMENTS FEATURING VIBRATION ENERGY MANAGEMENT

(75) Inventor: Daryoush Allaei, Minnetonka, MN (US)

(73) Assignee: Quality Research, Development & Consulting, Inc., Chaska, MN (US)

( * ) Notice: Subject to any disclaimer, the term of this patent is extended or adjusted under 35 U.S.C. 154(b) by 0 days.

(21) Appl. No.: 09/814,253

(22) Filed: Mar. 21, 2001

(65) Prior Publication Data

US 2002/0135112 A1 Sep. 26, 2002

(51) Int. Cl.[7] .................................................. F16F 1/00
(52) U.S. Cl. ....................................... 267/136; 188/378
(58) Field of Search ................................ 188/378, 379, 188/380, 266.7; 267/136, 182

(56) References Cited

U.S. PATENT DOCUMENTS 6,029,959 A * 2/2000 Gran et al. ................. 267/136
6,032,552 A * 3/2000 Alleai .......................... 74/574
6,116,389 A * 9/2000 Allaei ......................... 188/378

OTHER PUBLICATIONS

D. Allaei, D. Tarnowski, M. Mattice, and R. Testa, "Smart Isolation Mount for Airborne Guns," 10th U.S. Army Gun Dynamics Symposium, Paper No. 35, Apr. 2001.
D. Allaei, D. Tarnowski, M. Mattice, and R. Testa, "Smart Isolation Mount for Army Guns—Part 1: Preliminary results," Smart Structures and Materials 2000: Smart Electronics and MEMS, Proceedings of SPIE vol. 3990 (2000).

* cited by examiner

Primary Examiner—Jack Lavinder
Assistant Examiner—Xuan Lan Nguyen
(74) Attorney, Agent, or Firm—Leffert Jay & Polglaze, P.A.

(57) ABSTRACT

A mount that can be used to connect a vibration-generating substructure to a main structure. The mount uses vibration diverters to couple the vibration-generating substructure to the main structure. The vibration diverters can include passive elements, e.g., plates, ribs, notched plates, plates having wells, etc., active elements, e.g., actuators, sensor/actuators, etc., or a combination of passive and active elements. A vibration confiner interconnects the actuators. The vibration confiner can include a passive layer damping material for dissipating vibrations. The vibration diverters divert vibrations from the vibration-generating substructure to the vibration confiner.

32 Claims, 4 Drawing Sheets

SMART ISOLATION MOUNTS WITH CONTINUOUS STRUCTURAL ELEMENTS FEATURING VIBRATION ENERGY MANAGEMENT

STATEMENT AS TO RIGHTS UNDER FEDERALLY SPONSORED RESEARCH AND DEVELOPMENT

This invention was made with U.S. Government support under contract No. DAAE30–99-C-1014 and contract No. DAAE30–00-C-1007 awarded by the U.S. Army. The U.S. Government has certain rights in the invention.

TECHNICAL FIELD

The present invention relates generally to the field of vibration management and, in particular, to mounts that prevent the vibrations from being transmitted from vibrating objects to structures to which the vibrating objects are mounted.

BACKGROUND

Alternating disturbances that are imparted to a structure frequently cause the structure vibrate. These disturbances can be internal to the structure. For example, when a gun is fired, the alternating explosions of the bullets within the gun cause the gun to vibrate. The alternating disturbances can also be external to the structure. For example, in military situations the firing action of a gun generates and transmits vibrations to the supporting structure of the gun. The gun supporting structure in turn transmits the generated vibrations through its connecting points to a turret connected to the main structure of a vehicle (e.g., helicopter, airplane, ground vehicle, etc.). The turret transmits the vibrations to the main structure of the vehicle. The transmitted vibrations often damage onboard electronics and increase crew fatigue. In another example, a rotating element of a machine can cause the machine to vibrate. This vibration can be transmitted to structures to which the rotating machine is attached. Vibrations generated by rotating machines should be isolated from the main structure or floor on which the rotating machine rests.

Vibration is typically undesirable. Vibration often results in excessive audible noise that gives rise to safety issues, causes fatigue in mounting structures, and the like. Because of the undesirable effects of vibration, numerous methods have been employed in mounts for gun turrets, rotating machinery, or the like to manage vibration. These methods include both passive and active methods. Passive methods usually involve placing a vibration isolator, absorber, or damper between a vibration source, e.g., gun, rotating machine, or the like, and the structure in which the vibration is undesirable, e.g., helicopter shell, rotating machine mount, or the like. Vibration isolators intercept the vibration energy from the vibration source and prevent it from being transmitted to the structure. Vibration absorbers absorb the energy from the source. Vibration isolators and absorbers can be tuned only to one or a few resonant frequencies and therefore are only effective within a narrow frequency band around the selected frequencies. In some instances, vibration isolators and absorbers can amplify undesired vibrations at certain frequencies. Moreover, vibration isolators are not effective for isolating severe shocks or extreme vibratory loads. Vibration dampers receive vibration energy from the source and dissipate it at a faster rate. Dampers add weight to systems, and their performance is temperature dependent and is limited to near-resonant frequencies.

Many commercial and military applications include vibrations over a broad range of frequencies, rendering the above-mentioned passive vibration control methods ineffective for these applications.

Active vibration control methods include feedback and feed-forward vibration cancellation. Feedback vibration cancellation includes measuring the vibration, feeding the measurement back to a controller, sending a control signal from the controller to an actuator, and using the actuator to apply a force or a moment to counteract the vibration. Feed-forward vibration cancellation includes measuring the vibration, feeding the measurement forward to a controller, sending a control signal from the controller to an actuator, and using the actuator to apply a vibration that is substantially identical to the source vibration, with an appropriate phase shift, at or near the source. These active vibration control methods are expensive and hard to implement. Moreover, these methods require excessive amounts of power in that they are applied globally to all parts of the system and therefore are applied to parts of the system that are irrelevant to system performance.

For the reasons stated above, and for other reasons stated below which will become apparent to those skilled in the art upon reading and understanding the present specification, there is a need in the art for mounts that include continuous structural elements with vibration energy managing features, that have broader frequency ranges, that are easy to implement, and that can be applied to only those structural areas where vibration control is critical to system performance and therefore are more power efficient.

SUMMARY

The above-mentioned problems with existing vibration control approaches and other problems are addressed by embodiments of the present invention and will be understood by reading and studying the following specification. Embodiments of the present invention provide a "smart" isolation mount for connecting (or interfacing) a vibration-generating substructure (or subsystem) to a main structure. The isolation mount substantially reduces the transmission of vibrations from the vibration-generating substructure to the main structure. The mount also substantially stabilizes the vibration-generating substructure.

One embodiment provides a mount for connecting a vibration-generating substructure to a main structure that has at least two vibration diverters that mechanically couple the vibration-generating substructure to the main structure. The mount also has a vibration confiner that interconnects the two vibration diverters. Each vibration diverter diverts vibrations from the vibration-generating substructure to the vibration confiner.

Another embodiment provides a mount for connecting a vibration-generating substructure to a main structure that has at least two pairs of vibration diverters. Each pair of vibration diverters mechanically couples the vibration-generating substructure to the main structure. The mount has a pair of first vibration confiners, each interconnecting the respective vibration diverters of each of the two pairs of vibration diverters. The mount also has a second vibration confiner that interconnects the two pairs of vibration diverters. Each vibration diverter diverts vibrations from the vibration-generating substructure to at least one of the first vibration confiners and the second vibration confiner.

Another embodiment provides a mount for connecting a vibration-generating substructure to a main structure. The mount has four first corner regions in a first plane and four second corner regions in a second plane that is vertically displaced from the first plane, where the four first and four second corner regions are disposed between the vibration-generating substructure and the main structure. The mount has at least four first vibration diverters, each disposed at each of the four first corners, and at least four second vibration diverters, each disposed at each of the four second corners, where the four first and four second vibration diverters mechanically couple the vibration-generating substructure to the main structure. The mount also has a pair of first vibration confiners, each interconnecting two of the first corner regions and two of the second corner regions and thereby two of the first vibration diverters and two of the second vibration diverters. Moreover, the mount has a pair of second vibration confiners disposed perpendicularly to the first vibration confiners, each interconnecting two of the second vibration diverters. Each vibration diverter diverts vibrations from the vibration-generating substructure to at least one of the first vibration confiners and the second vibration confiners.

Another embodiment provides a method for controlling vibrations. The method includes receiving the vibrations from a vibration-generating substructure at at least two vibration diverters and diverting the vibrations away from each of the vibration diverters, using the respective vibration diverters, to a vibration confiner that interconnects the vibration diverters.

Another embodiment provides a method for controlling vibrations. The method involves receiving the vibrations from a vibration-generating substructure at at least two sensor/actuators and transmitting a sensing signal from each of the sensor/actuators that is indicative of the vibration at the respective sensor/actuators to an input of a controller. The method also includes transmitting a control signal from the controller to each of the sensor/actuators and diverting the vibrations away from the each of the sensor/actuators, using the respective sensor/actuators based on the respective control signals, to a vibration confiner that interconnects the sensor/actuators.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide a "smart" isolation mount for connecting (or interfacing) a vibration-generating substructure (or subsystem) to a main structure. The term "smart" refers to diverting vibratory energy from regions where the mount is attached to the substructure and the main structure and confining or dissipating the vibratory energy at other regions of the mount. This can be accomplished using passive elements as described in U.S. Pat. No. 6,116,389 entitled APPARATUS AND METHOD FOR CONFINEMENT AND DAMPING OF VIBRATION ENERGY issued on Sep. 12, 2000 and U.S. Pat. No. 6,032,552 entitled VIBRATION CONTROL BY CONFINEMENT OF VIBRATION ENERGY issued on Mar. 7, 2000, which are incorporated herein by reference. Active elements can also be used to divert vibratory energy from regions where the mount is attached to the substructure and the main structure, see pending U.S. application Ser. No. 09/721,102 entitled ACTIVE VIBRATION CONTROL BY CONFINEMENT filed on Nov. 22, 2000, which is incorporated herein by reference. Passive and active elements can also be combined to divert vibratory energy from regions where the mount is attached to the substructure and the main structure and confine or dissipate the vibratory energy at other regions of the mount.

Embodiments of the present invention represent an inexpensive, easy-to-implement, power-efficient alternative to using existing vibration control methods and is applicable over a broad range of vibration frequencies. Embodiments of the present invention provide a mount that substantially reduces the transmission of vibrations and shock energy from the vibration-generating substructure to the main structure. The mount also substantially stabilizes the vibration-generating substructure.

Figure 1:
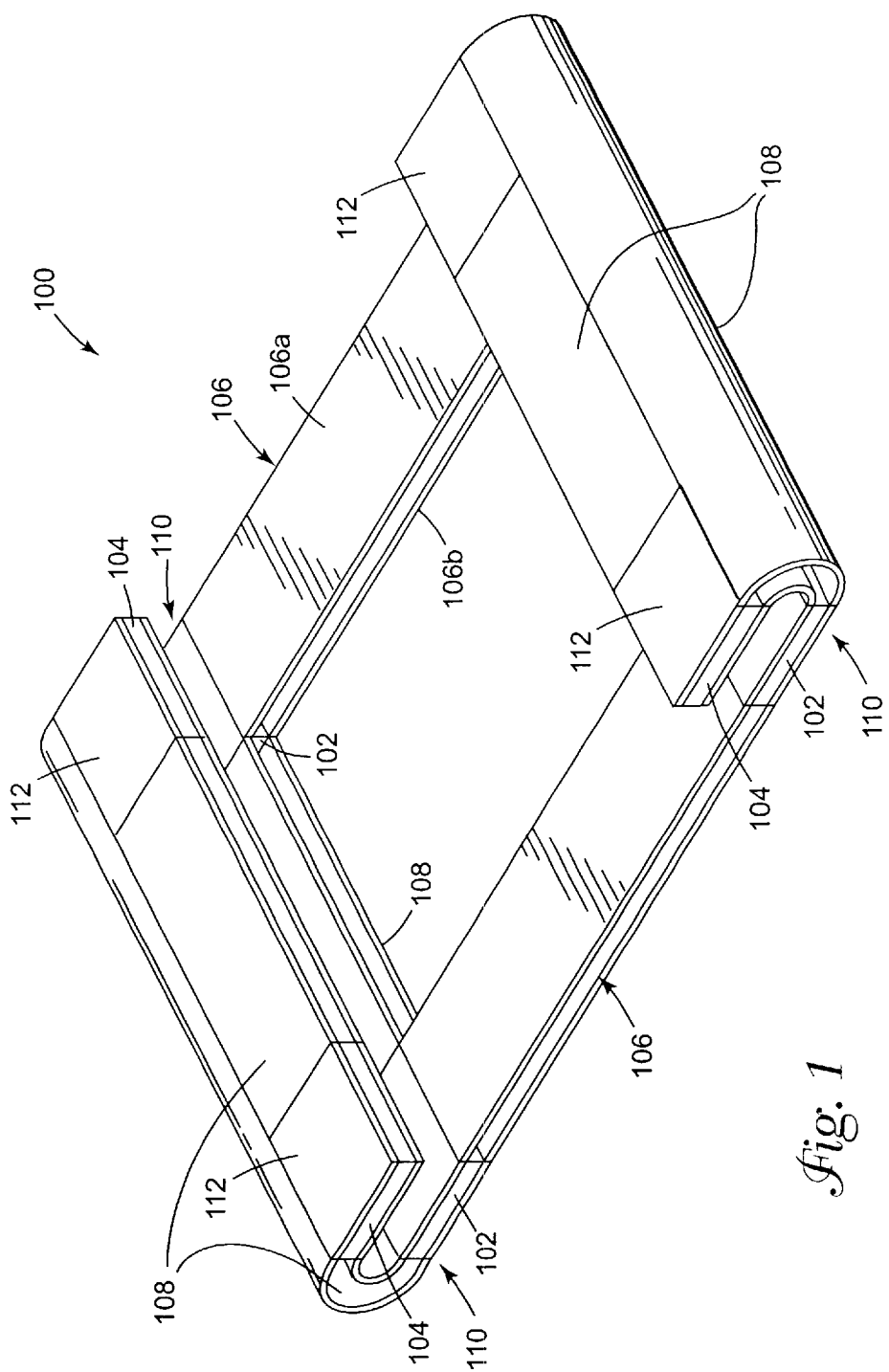
FIG. 1 is a front perspective view illustrating an embodiment of the present invention.
Figure 2A:
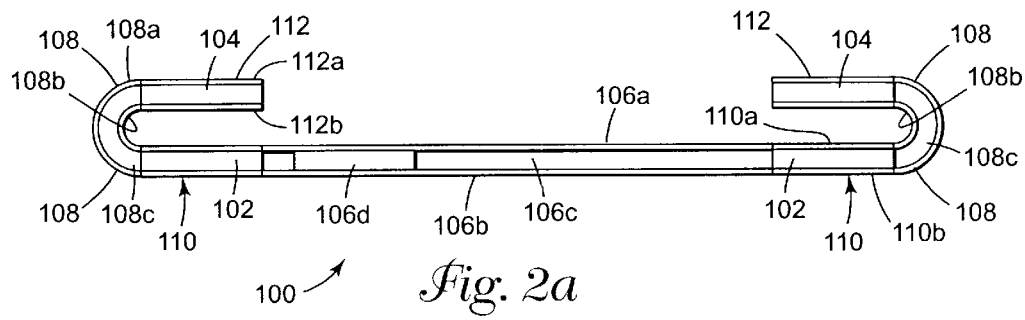
FIG. 2a is a front view of the embodiment of FIG. 1.
Figure 2B:
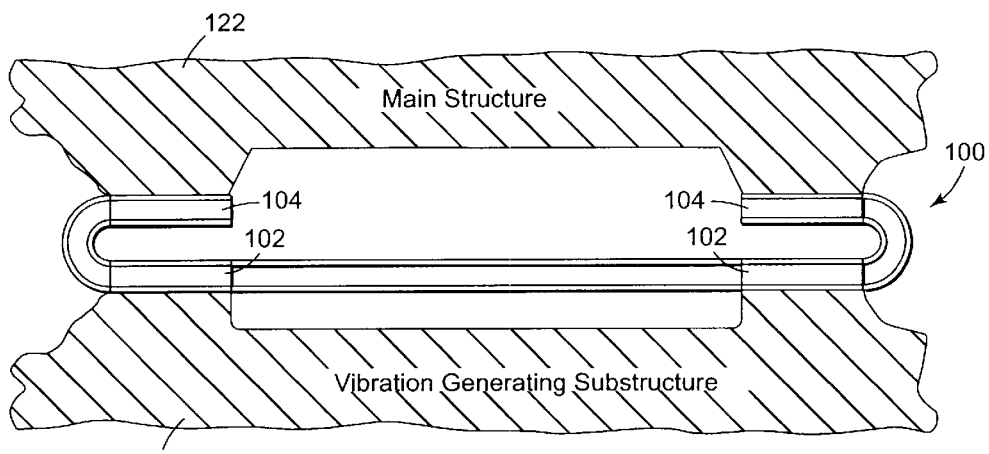
FIG. 2b is a front view of the embodiment of FIG. 1 in operation.

Mount 100 represents one embodiment of the present invention and is illustrated in FIG. 1 and in FIGS. 2a and 2b. FIG. 1 is a front perspective view and FIG. 2a is a front view of the mount. FIG. 2b is a front view showing mount 100 connecting vibration-generating substructure (subsystem) 120, e.g., a rotating machine, a gun turret, or the like, to main structure 122, e.g., a floor, vehicle, platform, or the like. Mount 100 includes four vibration diverters 102 and four vibration diverters 104. As demonstrated in FIG. 2b, vibration diverters 102 and 104 mechanically couple vibration-generating substructure 120 to main structure 122. Mount 100 includes a pair of vibration confiners 106. Each of vibration confiners 106 interconnects two vibration diverters 102. Mount 100 also includes a second pair of vibration confiners 108. Each of vibration confiners 108 interconnects two vibration diverters 102 and two vibration diverters 104. Vibration diverters 102 and 104 divert vibrations from vibration-generating substructure 120 to vibration confiners 106 and 108.

More specifically, mount 100 includes four corner regions 110. Each of confiners 106 interconnects two of corner regions 110. Mount 100 includes four corner regions 112 that are vertically displaced from corner regions 110. Each of confiners 108 interconnects two of corner regions 112 and two of corner regions 110. In one embodiment, confiners 106, corner regions 110, confiners 108, and corner regions 112 are integral. It will be appreciated by those of ordinary skill in the art that corner regions 110 can be attached to confiners 106 and 108 and corner regions 112 can be attached to confiners 108 using any method that is suitable for a particular application, such as welding, gluing, or the like. Confiners 106 and 108 can be fabricated from a variety of materials, such as steel, plastic, aluminum, fiber reinforced laminates, composites, or the like, according to the particular application.

Each of confiners 106 comprises parallel plates 106a and 106b separated by channel 106c. In one embodiment, channel 106c contains passive layer damping material 106d, e.g., a viscoelastic material, as shown in FIG. 2a. In this embodiment, confiners 106 represent a constraint layer damping method. In another embodiment, confiners 106 are tubular. In another embodiment, tubular confiners 106 contain a passive layer damping material, e.g., a viscoelastic material.

Each of confiners 108 is generally C-shaped and comprises parallel members 108a and 108b separated by channel 108c. In one embodiment, channel 108c contains a passive layer damping material, e.g., a viscoelastic material, between them. In this embodiment, confiners 108 represent a constraint layer damping method. In another embodiment, confiners 108 are tubular. In another embodiment, tubular confiners 108 contain a passive layer damping material, e.g., a viscoelastic material.

Each of corner regions 110 comprises parallel plates 110a and 110b. Parallel plates 110a and 110b sandwich a vibration diverter 102 between them. In one embodiment, corner regions 110 are tubular and contain a vibration diverter 102 within them. Each of corner regions 112 comprises parallel plates 112a and 112b. Parallel plates 112a and 112b sandwich a vibration diverter 104 between them. In one embodiment, corner regions 112 are tubular and contain a vibration diverter 104 within them.

In one embodiment, vibration diverters 102 and 104 are passive elements and include plates, ribs, notched plates, plates having wells, etc. These elements are selected and designed to divert vibrations within particular frequency and/or amplitude ranges according to the specific design of mount 100, the vibrations of vibration-generating substructure 120, and/or the vibration characteristics of main structure 122. Passive vibration diverters are described in U.S. Pat. No. 6,116,389 entitled APPARATUS AND METHOD FOR CONFINEMENT AND DAMPING OF VIBRATION ENERGY issued on Sep. 12, 2000 and U.S. Pat. No. 6,032,552 entitled VIBRATION CONTROL BY CONFINEMENT OF VIBRATION ENERGY issued on Mar. 7, 2000, which are incorporated herein by reference.

In one embodiment, vibration diverters 102 and 104 are active elements and are piezoelectric actuators comprising a formulation of lead, magnesium, and niobate (PMN), a formulation of lead, zirconate, and titanate (PZT), or the like. Piezoelectric construction and operation are well known to those in the art. A detailed discussion, therefore, of specific constructions and operation is not provided herein. It will be appreciated that when a voltage is applied to the piezoelectric actuators 102 and 104, it imparts a force to the corresponding corner region 110 or 112. In another embodiment, vibration diverters 102 and 104 include active and passive elements. In another embodiment, vibration diverters 102 and 104 are electromagnetic actuators.

In operation, vibration diverters 102 and 104 receive vibrations from vibration-generating substructure 120 at corner regions 110 and 112, respectively. Vibration diverters 102 and 104 divert the vibrations away from the respective corner regions to confiners 106 and/or 108. In embodiments where vibration diverters 102 and 104 include only active elements or both active and passive elements, each of the active elements receives a voltage that causes it to apply a force to the respective corner regions. In embodiments where confiners 106 and/or 108 include a passive layer damping material, confiners 106 and/or 108 dissipate the vibrations.

Figure 3:
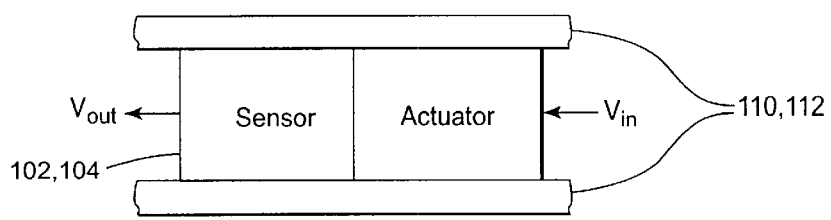
FIG. 3 is a side view illustrating an embodiment of a sensor/actuator that can be used to sense and divert vibrations.

In another embodiment, vibration diverters 102 and 104 include a sensor and an actuator, as generally illustrated in FIG. 3 by sensor/actuator 102, 104, where both the sensor and actuator are piezoelectric materials, e.g., a formulation of lead, magnesium, and niobate (PMN), a formulation of lead, zirconate, and titanate (PZT), or the like. When a voltage Vin is applied to the piezoelectric material of the actuator portion of sensor/actuator 102, 104, it imparts a force to the corresponding corner region 110 or 112. Conversely, if one of corner regions 110 or 112 imparts a vibratory motion or a force to the corresponding sensor/actuator 102, 104 it produces voltage Vout that is indicative of the vibratory motion or force. In another embodiment, the actuator portion of sensor/actuator 102, 104 is an electromagnetic actuator. Ceramic-based (e.g., PZT and PMN) sensors are only one of the types of sensors that can be used. This invention is not limited to the use of ceramic-based sensors.

Figure 4:
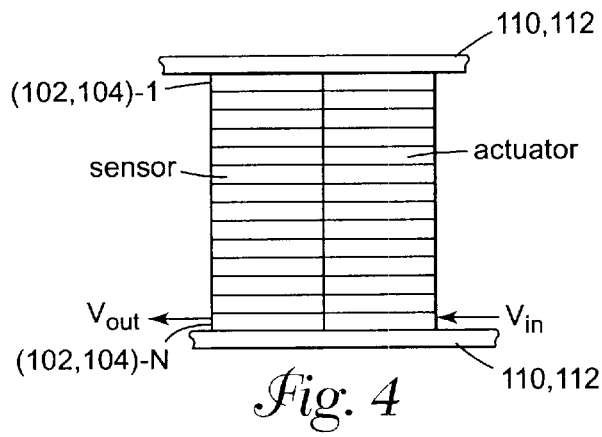
FIG. 4 is a side view illustrating another embodiment of a sensor/actuator that can be used to sense and divert vibrations.
Figure 5:
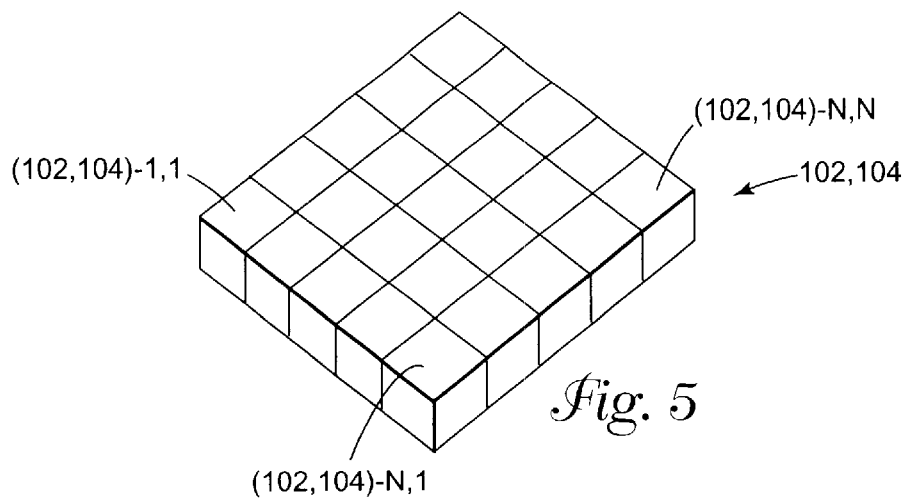
FIG. 5 is a perspective view illustrating a sensor/actuator having an array of components.

FIG. 4 illustrates another embodiment of sensor/actuator 102, 104. This embodiment comprises piezoelectric layers (102, 104)-1 through (102, 104)-N. Each of layers (102, 104)-1 through (102, 104)-N includes a sensor portion and an actuator portion. In one embodiment, the sensor portions of layers (102, 104)-1 through (102, 104)-N are electrically interconnected in parallel, and the actuator portions of layers (102, 104)-1 through (102, 104)-N are electrically interconnected in parallel. Stacking of layers (102, 104)-1 through (102, 104)-N amplifies the force output of the actuator portion and the force exerted on the sensor portion by the number of layers. Sensor/actuators 102, 104 such as demonstrated in FIG. 4 can be configured as elongated rods or rectangular blocks. For example, FIG. 5 illustrates another embodiment of sensor/actuator 102, 104. This embodiment includes an N×N array comprising sensor/actuators (102, 104)-1,1 through (102, 104)-N,N.

Figure 6:
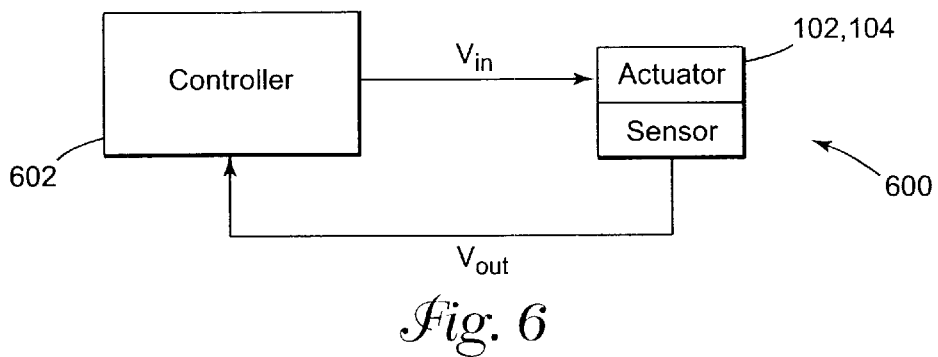
FIG. 6 is a block diagram illustrating a control apparatus for controlling vibrations.

FIG. 6 illustrates control apparatus 600 for controlling each of sensor/actuators 102 and 104, generally represented by sensor/actuator 102, 104. An output of controller 602 is coupled to the actuator portion of sensor/actuator 102, 104, and an input of controller 602 is coupled to the sensor portion of sensor/actuator 102, 104. Controller 602 receives signals (Vout) from the sensor portion indicative of vibrations transmitted to the sensor and transmits signals (Vin) to the actuator portion that mitigate the vibration. It will be appreciated by those of ordinary skill in the art that controller 600 can use a variety of control algorithms, such as filtered-X Least Mean Square (LMS) adaptive filter, baseband demodulated feedback controller, or tracking bi-quadradic feedback controller.

In operation, corner regions 112 are attached to main structure 122 and corner regions 110 are attached to vibration-generating substructure 120 so that sensor/ actuators 102 and 104 couple vibration-generating substructure 120 to main structure 122, as shown in FIG. 2b. For example, corner regions 112 can be attached to the bottom portion of a helicopter, and corner regions 110 can be attached to a gun turret that vibrates in response to a periodically firing gun. The sensor portion of sensor/actuators 102 and 104 receives vibrations from vibration-generating substructure 120. The sensor portion of each sensor/actuator 102 and 104 transmits a signal (Vout) to controller 602 that is indicative of the vibration received.

Controller 602 transmits a signal (Vin) to the actuator portion of each sensor/actuator 102 and/or 104 that causes the respective actuator portion to apply a force to the respective corner regions 110 and/or 112. The magnitude of the force applied to each of corner regions 110 and/or 112 is calculated to alter the vibration characteristics of the respective corner region so that the vibration is diverted to confiners 106 and/or 108. The magnitude of the force is calculated using the control algorithms of controller 602. The calculation can be based on the amplitude and frequency of the vibration as given by Vout, the material and geometric parameters that govern the vibration of corner regions 110 and/or 112 and/or confiners 106 and/or 108, and/or the like.

Figure 7A:
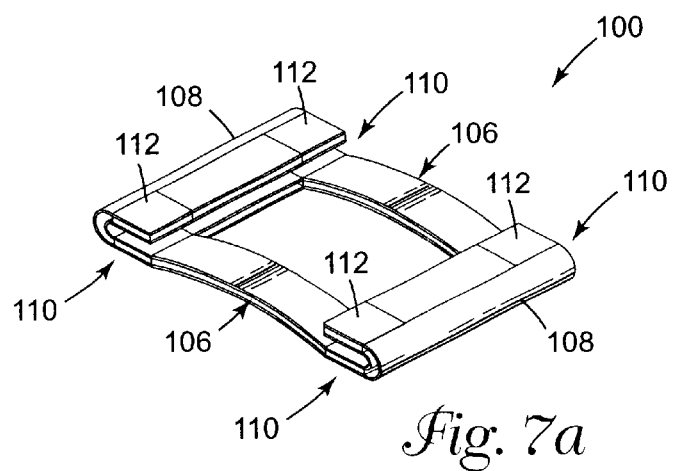
FIG. 7a is a front perspective view demonstrating a symmetric—symmetric first bending mode of vibration of an embodiment of the present invention.
Figure 7B:
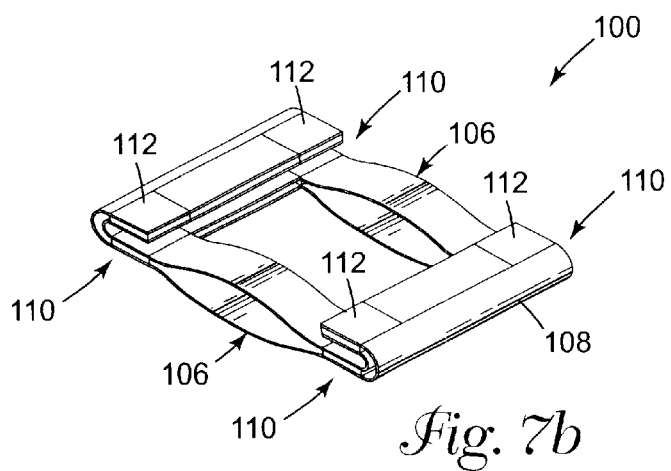
FIG. 7b is a front perspective view demonstrating a symmetric-asymmetric first bending mode of vibration of an embodiment of the present invention.
Figure 7C:
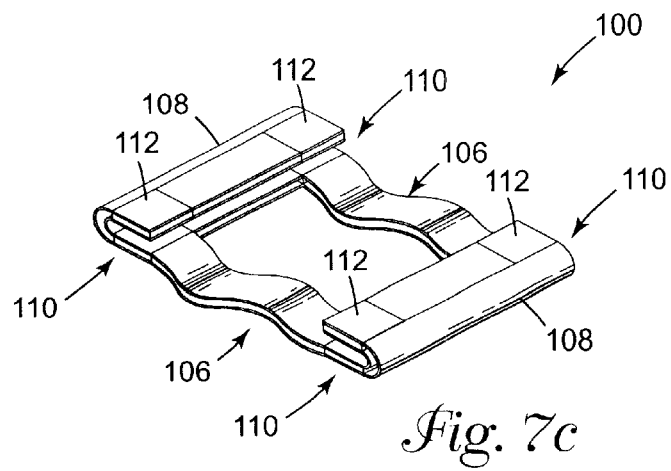
FIG. 7c is a front perspective view demonstrating a symmetric—symmetric second bending mode of vibration of an embodiment of the present invention.

The force applied to each of corner regions 110 and/or 112 that diverts the vibrations away from corner regions 110 and/or 112 can cause confiners 106 and/or 108 to vibrate in a variety of different ways, depending on the nature of the vibrations received at the corner regions and/or the calculations performed by the control algorithms. For example, FIG. 7a demonstrates a symmetric first bending mode of vibration with the parallel plates being in-phase. FIG. 7b demonstrates a symmetric first bending mode of vibration with the parallel plates being 180° out-of-phase, and FIG. 7c demonstrates a symmetric second bending mode of vibration with the parallel plates being in-phase. In embodiments where confiners 106 and/or 108 include a passive layer damping material, confiners 106 and/or 108 dissipate the vibrations.

Detailed descriptions of how energy can be diverted from one region to another and how energy can be confined within a particular region are given in U.S. Pat. No. 6,116,389 entitled APPARATUS AND METHOD FOR CONFINEMENT AND DAMPING OF VIBRATION ENERGY issued on Sep. 12, 2000 and U.S. Pat. No. 6,032,552 entitled VIBRATION CONTROL BY CONFINEMENT OF VIBRATION ENERGY issued on Mar. 7, 2000, which are incorporated herein by reference, and in pending U.S. application Ser. No. 09/721,102 entitled ACTIVE VIBRATION CONTROL BY CONFINEMENT filed on Nov. 22, 2000, which is incorporated herein by reference.

CONCLUSION

Embodiments of the present invention have been described. In one embodiment, a mount has been described that can be used to connect a vibration-generating substructure to a main structure. The mount uses vibration diverters to couple the vibration-generating substructure to the main structure. The vibration diverters can include passive elements, e.g., plates, ribs, notched plates, plates having wells, etc., active elements, e.g., actuators, sensor/actuators, etc., or a combination of passive and active elements. A vibration confiner interconnects the vibration diverters. The vibration confiner can include a passive layer damping material for dissipating vibrations. The vibration diverters divert vibrations from the vibration-generating substructure to the vibration confiner. This substantially reduces the transmission of vibrations from the vibration-generating substructure to the main structure and substantially stabilizes the vibration-generating substructure. The mount represents an inexpensive, easy-to-implement, power-efficient alternative to using existing vibration control methods, and can be used for a broader range of vibration frequencies.

Although specific embodiments have been illustrated and described in this specification, it will be appreciated by those of ordinary skill in the art that any arrangement that is calculated to achieve the same purpose may be substituted for the specific embodiment shown. This application is intended to cover any adaptations or variations of the present invention. For example, the mount can be of other geometric shapes, e.g., triangular, circular. The vibration diverters can all be in the same plane, or they can be in a multitude of planes. Further, any number of vibration diverters can be used, and they can be positioned at locations that are intermediate to the corner regions. Moreover, the vibration confiners can be continuous solids, instead of tubes or parallel-plate channels.

What is claimed is:

1. A mount for connecting a vibration-generating substructure to a main structure, the mount comprising:
    at least two vibration diverters, wherein each diverter mechanically couples the vibration-generating substructure to the main structure, wherein a first of the two vibration diverters mechanically couples a first location of the vibration-generating substructure to a first location of the main structure and a second of the two vibration diverters mechanically couples a second location of the vibration-generating substructure that is separated from the first location of the vibration-generating substructure to a second location of the main structure that is separated from the first location of the main structure; and
    a vibration confiner that directly interconnects the two vibration diverters, wherein each vibration diverter diverts vibrations from the vibration-generating substructure to the vibration confiner.

2. The mount of claim 1, wherein each vibration diverter is selected from the group comprising an actuator, a plurality of actuators, an actuator comprising a piezoelectric material, an actuator comprising a plurality of stacked piezoelectric layers, and an electromagnetic actuator.

3. The mount of claim 1, wherein each vibration diverter is an actuator that receives an electrical signal based on vibrations emitted by the vibration-generating substructure.

4. The mount of claim 3, further comprising at least two sensors that sense vibrations, each respectively located adjacent each of the actuators.

5. The mount of claim 4, wherein each of the sensors comprises a piezoelectric material.

6. The mount of claim 4, further comprising a controller having an input electrically coupled to each sensor that receives a sensing signal indicative of the vibrations from each sensor, the controller having an output electrically coupled to each actuator that transmits the electrical signal to the respective actuator that is based on the respective sensing signal.

7. The mount of claim 1, wherein the vibration confiner includes a damping material that dissipates vibratory energy.

8. The mount of claim 1, wherein each vibration diverter is passive.

9. The mount of claim 1, wherein each vibration diverter includes passive and active elements.

10. A mount for connecting a vibration-generating substructure to a main structure, the mount comprising:

at least two pairs of vibration diverters, each pair mechanically coupling the vibration-generating substructure to the main structure;

a pair of first vibration confiners, each interconnecting the respective vibration diverters of each of the two pairs of vibration diverters; and a second vibration confiner that directly interconnects the two pairs of vibration diverters, wherein each vibration diverter diverts vibrations from the vibration-generating substructure to at least one of the first vibration confiners and the second vibration confiner.

11. The mount of claim 10, wherein each vibration diverter is selected from the group comprising an actuator, a plurality of actuators, an actuator comprising a piezoelectric material, an actuator comprising a plurality of stacked piezoelectric layers, and an electromagnetic actuator.

12. The mount of claim 10, wherein each vibration diverter is an actuator that receives an electrical signal based on vibrations emitted by the vibration-generating substructure.

13. The mount of claim 12, further comprising at least two sensors that sense vibrations, each respectively located adjacent each of the actuators.

14. The mount of claim 13, wherein each of the sensors comprises a piezoelectric material.

15. The mount of claim 13, further comprising a controller having an input electrically coupled to each sensor that receives a sensing signal indicative of the vibrations from each sensor, the controller having an output electrically coupled to each actuator that transmits the electrical signal to the respective actuator that is based on the respective sensing signal.

16. The mount of claim 10, wherein each vibration diverter is passive.

17. The mount of claim 10, wherein each vibration diverter includes passive and active elements.

18. The mount of claim 10, wherein the vibration diverters of each of the two pairs of vibration diverters are vertically displaced.

19. The mount of claim 10, wherein the second vibration confiner is straight.

20. The mount of claim 10, wherein at least one of the pair of first vibration confiners and the second vibration confiner includes a damping material that dissipates vibratory energy.

21. A mount for connecting a vibration-generating substructure to a main structure, the mount comprising:

at least two pairs of vibration diverters, each pair mechanically coupling the vibration-generating substructure to the main structure;

a pair of first vibration confiners, each interconnecting the respective vibration diverters of each of the two pairs of vibration diverters, wherein each of the pair of first vibration confiners is C-shaped; and a second vibration confiner that interconnects the two pairs of vibration diverters, wherein each vibration diverter diverts vibrations from the vibration-generating substructure to at least one of the first vibration confiners and the second vibration confiner.

22. A mount for connecting a vibration-generating substructure to a am structure, the mount comprising:

four first corner regions in a first plane;

four second corner regions in a second plane that is vertically displaced from the first plane, wherein the four first and four second corner regions are disposed between the vibration-generating substructure and the main structure;

at least four first vibration diverters, each disposed at each of the four first corner regions;

at least four second vibration diverters, each disposed at each of the four second corner regions, wherein the four first and four second vibration diverters mechanically couple the vibration-generating substructure to the main structure;

a pair of first vibration confiners, each interconnecting two of the first corner regions and two of the second corner regions and thereby two of the first vibration diverters and two of the second vibration diverters; and a pair of second vibration confiners disposed perpendicularly to the first vibration confiners, each interconnecting two of the second vibration diverters, wherein each vibration diverter diverts vibrations from the vibration-generating substructure to at least one of the first vibration confiners and the second vibration confiners.

23. The mount of claim 22, wherein each of the first and second vibration diverters is selected from the group comprising an actuator, a plurality of actuators, an actuator comprising a piezoelectric material, an actuator comprising a plurality of stacked piezoelectric layers, and an electromagnetic actuator.

24. The mount of claim 22, wherein each of the first and second vibration diverters is an actuator that receives an electrical signal based on vibrations emitted by the vibration-generating substructure.

25. The mount of claim 24, further comprising at least two sensors that sense vibrations, each respectively located adjacent each of the actuators.

26. The mount of claim 25, wherein each of the sensors comprises a piezoelectric material.

27. The mount of claim 25, further comprising a controller having an input electrically coupled to each sensor that receives a sensing signal indicative of the vibrations from each sensor, the controller having an output electrically coupled to each actuator that transmits the electrical signal to the respective actuator that is based on the respective sensing signal.

28. The mount of claim 22, wherein each vibration diverter is passive.

29. The mount of claim 22, wherein each vibration diverter includes passive and active elements.

30. The mount of claim 22, wherein each of the pair of first vibration confiners is C-shaped.

31. The mount of claim 22, wherein each of the second vibration confiners is straight.

32. The mount of claim 22, wherein at least one of the pair of first vibration confiners and the pair of second vibration confiners includes a damping material that dissipates vibratory energy.

\* \* \* \* \*